US010828699B2

(12) United States Patent
Mercelis et al.

(10) Patent No.: US 10,828,699 B2
(45) Date of Patent: Nov. 10, 2020

(54) METHOD FOR MANUFACTURING THIN-WALLED STRUCTURES IN LAYERS

(75) Inventors: Peter Mercelis, Heverlee (BE); Jonas Van Vaerenbergh, Heverlee (BE); Wilfried Van Der Perre, Heverlee (BE)

(73) Assignee: Layerwise N.V., Haasrode (BE)

( * ) Notice: Subject to any disclaimer, the term of this patent is extended or adjusted under 35 U.S.C. 154(b) by 375 days.

(21) Appl. No.: 13/983,666

(22) PCT Filed: Feb. 6, 2012

(86) PCT No.: PCT/BE2012/000006
§ 371 (c)(1),
(2), (4) Date: Aug. 5, 2013

(87) PCT Pub. No.: WO2012/103603
PCT Pub. Date: Aug. 9, 2012

(65) Prior Publication Data
US 2013/0312928 A1    Nov. 28, 2013

(30) Foreign Application Priority Data

Feb. 4, 2011    (BE) ................................. 2011/0070

(51) Int. Cl.
*B22F 3/105*    (2006.01)
*B22F 5/00*    (2006.01)
(Continued)

(52) U.S. Cl.
CPC ............ *B22F 3/105* (2013.01); *B22F 3/1055* (2013.01); *B22F 5/00* (2013.01); *B22F 5/003* (2013.01);
(Continued)

(58) Field of Classification Search
CPC ... B22F 2003/1058; B22F 5/003; B29C 64/40
See application file for complete search history.

(56) References Cited

U.S. PATENT DOCUMENTS 6,884,486 B2 *   4/2005   Estrin ................... B01D 29/03
                                                        156/89.11
2004/0012124 A1   1/2004   Li et al.
(Continued)

FOREIGN PATENT DOCUMENTS

DE          19538257 A1     4/1996
EP           2022622 A1     2/2009

*Primary Examiner* — Christopher S Kessler
*Assistant Examiner* — Jeremy C Jones
(74) *Attorney, Agent, or Firm* — Browdy and Neimark, PLLC

(57) ABSTRACT

The invention concerns a method for manufacturing at least one thin-walled structure (1,11,13,17,18), whereby this structure is built layer by layer by applying successive powder layers extending substantially horizontally and by moving an energy beam over each of these powder layers according to a predetermined pattern so as to make said powder melt and subsequently make it solidify or sinter, such that successive layers connected to each other of said thin-walled structure (1,11, 13,17,18) are formed which extend according to a horizontal cross section of this thin-walled structure (1, 11,13,17,18). According to the method a support structure (20) is built in layers together with said thin-walled structures (1,11,13,17,18) and connected to it such that a rigid unit (14) is manufactured, whereby after building this unit (14) layer by layer, at least the thin-walled structures (1,11,13,17,18) are annealed in order to at least partly eliminate any stresses present, and whereby both structures are separated from each other.

16 Claims, 3 Drawing Sheets

(51) Int. Cl.
  *B29C 64/153* (2017.01)
  *B29C 64/40* (2017.01)
  *B33Y 80/00* (2015.01)

(52) U.S. Cl.
  CPC ............ *B29C 64/153* (2017.08); *B29C 64/40* (2017.08); *B22F 2003/1058* (2013.01); *B33Y 80/00* (2014.12); *Y02P 10/295* (2015.11)

(56) References Cited

U.S. PATENT DOCUMENTS

2007/0145629 A1   6/2007  Ebert et al.
2009/0039570 A1*  2/2009  Clark .................... B22F 3/1055
                                                  264/653

* cited by examiner

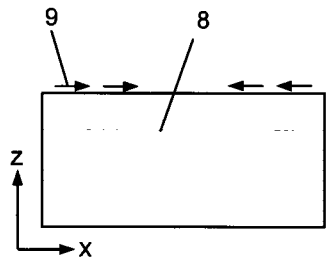
*Fig. 5a*
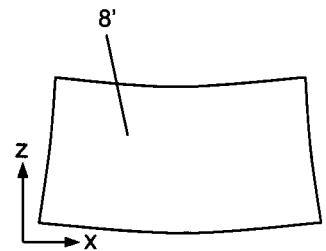
*Fig. 5b*
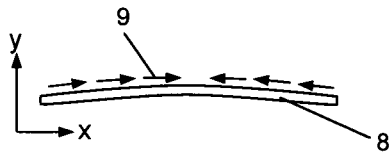
*Fig. 6a*
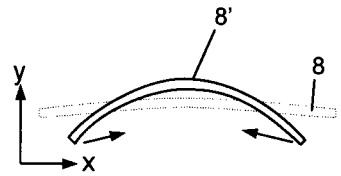
*Fig. 6b*
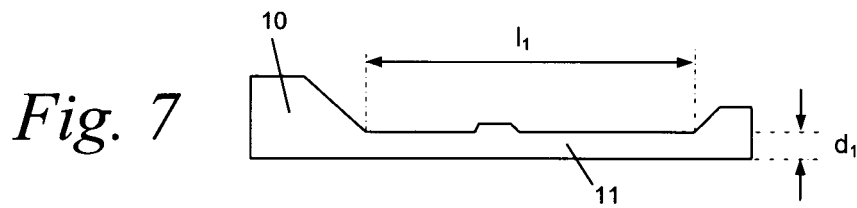
*Fig. 7*          $l_1 / d_1 > 10$
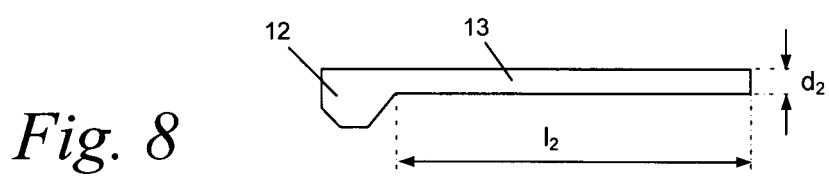
*Fig. 8*          $l_2 / d_2 > 10$
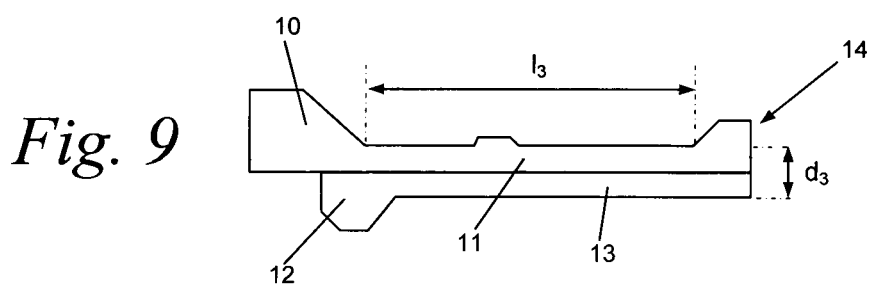
*Fig. 9*          $l_3 / d_3 < 10$

METHOD FOR MANUFACTURING THIN-WALLED STRUCTURES IN LAYERS

The invention concerns a method for manufacturing one, two or several thin-walled structures, whereby these thin-walled structures are built layer by layer by applying successive powder layers extending almost horizontally and by moving an energy beam over each of these powder layers according to a predetermined pattern in order to make said powder melt entirely or partly and subsequently make it solidify or sinter, such that successive layers of said thin-walled structures are formed extending according to a horizontal cross section of these structures.

Such thin-walled structures may form an independent unit or be part of a product which also has thick-walled parts, for example.

According to the method of the invention, said thin-walled structures or products are made, for example, by selective laser melting or selective laser sintering of for example a metal powder.

When applying such a method for manufacturing a thin-walled structure according to the present state of the art, several problems arise due to the presence of thermal stresses and residual stresses in this structure. These stresses arise due to the local heating and subsequent cooling of the structure on the spot of the incident energy beam. This has for a result that the thin-walled structure or a corresponding product to be made is deformed and thus obtains a shape which deviates from the desired or planned shape or that even cracks may be formed in the thin-walled structure.

Document EP 2022622 A1 describes a method for manufacturing an object whereby a support structure is built round this object and whereby the support structure is connected to the object by support connections. The manufacture of such a support structure, however, considerably increases the production time of an object and leads to a large increase in material consumption.

The invention aims to remedy these disadvantages by providing a method which makes it possible to manufacture thin-walled structures or products containing a thin-walled structure by means of a production process whereby a focused energy beam hits successive powder layers according to a predetermined pattern in order to produce the structures or products concerned layer by layer.

Thus, the method according to the invention makes sure that thin-walled structures can be manufactured by means of a production process in layers without any deformation or cracking occurring.

To this aim, said thin-walled structures are horizontally connected in such a way that the thin-walled structures form a rigid unit, whereby after this unit with said thin-walled structures has been built layer by layer, it is annealed in order to at least partly eliminate any stresses present. Next, the obtained thin-walled structures are separated.

According to an alternative embodiment of the method according to the invention, the thin-walled structures are separated and then annealed. In that case, the thin-walled structures, while being annealed, are preferably pressed against a surface which makes sure that the desired shape of the thin-walled structure is obtained. When the thin-walled structure is for example a flat plate, it will be pressed against a flat surface while being annealed, such that after the annealing, the thin-walled structure will still be flat and remain so.

By a thin-walled structure is meant, for example, a structure whose ratio of the horizontal length to the horizontal thickness is larger than 10. Practically, according to the method of the invention, these thin-walled structures are horizontally connected, such that these thin-walled structures form a nearly rigid unit whereby the ratio of the horizontal length to the horizontal thickness is smaller than or equal to 10.

Alternatively, by a thin-walled structure may for example be understood a structure whereby the ratio of the surface of a horizontal section to the average horizontal thickness of this structure is larger than a predetermined value.

Advantageously, said thin-walled structures extend practically parallel to one another while being manufactured.

Preferably, the thin-walled structures extend practically vertically in a horizontal plane while being manufactured according to the invention.

According to a preferred embodiment of the method according to the invention, a support structure is made which is built together with said thin-walled structures and which connects the latter to one another. The support structure preferably has a lower density than said thin-walled structures.

According to an interesting embodiment of the method according to the invention, said thin-walled structures are oriented to each other in such a way that stresses being built up in these thin-walled structures during their manufacture will neutralize each other at least partly.

To this end, two thin-walled structures are for example made simultaneously and symmetrically in relation to one another, whereby they are connected in such a way that stresses being created in both structures will neutralize each other. Thus, it is possible to avoid any deformations which might occur if the thin-walled structures were being built individually.

The invention also concerns a method for manufacturing at least one thin-walled structure which is built in layers, whereby a support structure is built in layers together with said thin-walled structure, whereby this support structure joins at least one side of said thin-walled structure and is connected to the latter while the thin-walled structure and the support structure are being built in layers together, such that a rigid unit is made. After this unit has been built layer by layer, at least the thin-walled structure will be annealed in order to at least partly eliminate any stresses present and both structures are separated from one another.

Other particularities and advantages of the invention will become clear from the following description of some specific embodiments of the method according to the invention. This description is given as an example only and does not limit the scope of the claimed protection in any way; the following figures of reference refer to the accompanying drawings.

FIGS. 5a and 5b schematically represent a side elevation of a thin-walled bent plate made by means of a method according to the present state of the art.

FIGS. 6a and 6b schematically represent a view from above of the thin-walled bent plate of FIGS. 5 and 5b.

FIG. 7 is a schematic view from above of a first product having a thin-walled structure.

FIG. 8 is a schematic view from above of a second product having a thin-walled structure.

FIG. 9 is a schematic view from above of a unit made according to the method of the invention, and which is composed of the first and second product of FIG. 7 and FIG. 8 respectively.

Figure 10:
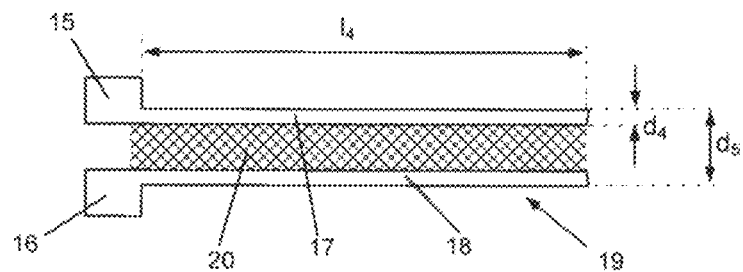

FIG. 10 is a schematic view from above of two thin-walled structures which are connected by means of a support structure made according to the method of the invention.

Figure 11:
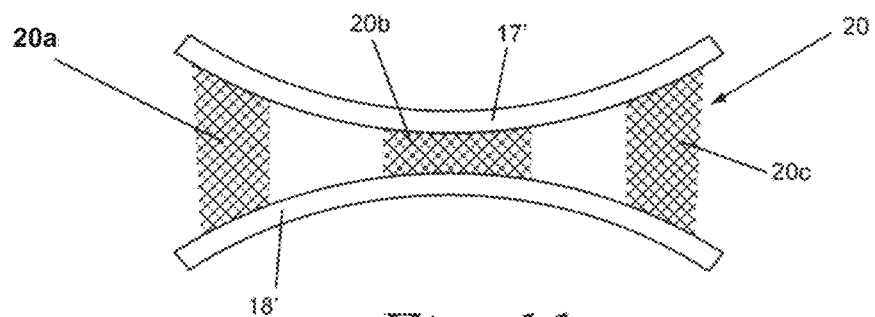
Figure 12:
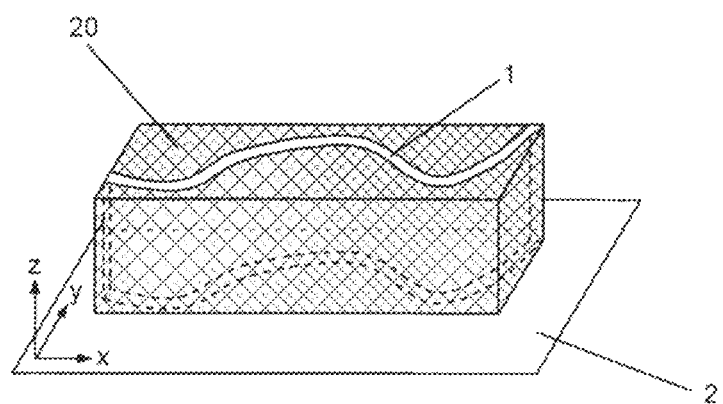

FIG. 11 is a schematic view from above of two other thin-walled structures which are connected by means of a support structure made according to the method of the invention FIG. 12 is a schematic view in perspective of a thin-walled structure which is connected to a support structure made according to an embodiment of the method according to the invention.

In the different drawings, identical figures of reference refer to identical or analogous elements.

The invention generally concerns a method for manufacturing products having thin-walled structures. The shape and dimensions of such three-dimensional products are determined for example by means of a CAD program and are thus available in electronic format.

According to the invention, a product is manufactured layer by layer by applying successive powder layers on a horizontal base plate and by moving a focused energy beam over each powder layer according to a predetermined pattern. As a result of the movement of the energy beam over the powder, the latter melts at least partly and subsequently solidifies, such that successive cross sections of the product are made in this way which adhere to each other. When the product manufacture is finished, the unmelted loose powder is removed from the product. Such a production process is also known as selective laser sintering, selective laser melting, electron beam melting or 3D laser cladding.

In the case of what is called 3D laser cladding, no successive powder layers are applied, but powder is projected onto the appropriate layer of a product to be made while it is practically simultaneously melted by, for example, a laser beam.

Figure 1:
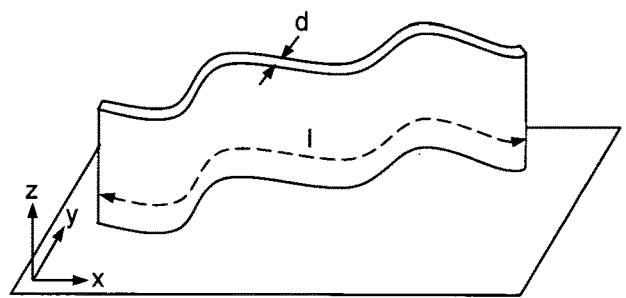
FIG. 1 is a schematic view in perspective of a thin-walled structure.

The invention in particular concerns a method for manufacturing thin-walled structures by means of the above-described production method. By thin-walled structure is meant in the present description any structure whose ratio of the horizontal length (l) to the horizontal thickness (d) of each of said thin-walled structures is larger than 10 or, in other words whereby l/d>10. The horizontal length is hereby the length of a curve lying in a horizontal plane and running according to the periphery of the structure, as is schematically represented in FIG. 1.

It appears that, in the manufacture of products having such thin-walled structures, thermal stresses occur which give rise to product deformations and/or product cracking, which should be avoided.

Figure 2:
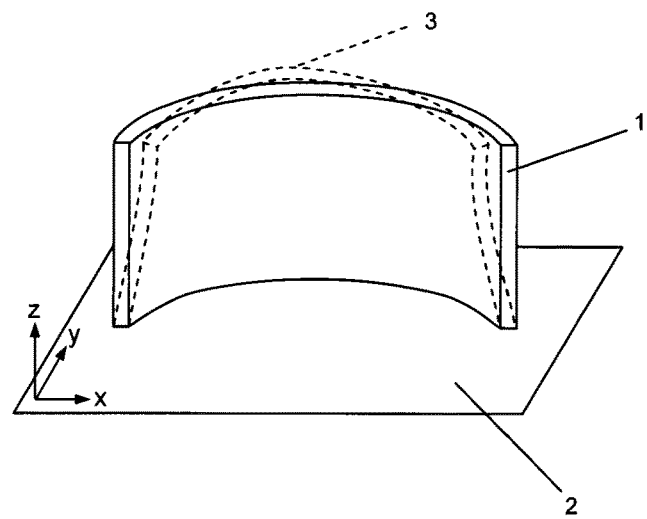
FIG. 2 is a schematic view in perspective of a first thin-walled structure made by means of a method according to the present state of the art.

The solid line in FIG. 2 represents a planned and ideal shape of a thin-walled structure 1 which was made on a horizontal base plate 2 by for example selective laser melting of a metal powder in accordance with a method according to the present state of the art. However, when this method is applied, it appears that, due to thermal stresses being generated in the structure 1, not the planned shape is obtained for the thin-walled structure but a distorted shape 3 deviating from the latter, as indicated by the dashed line in this figure.

Figure 3:
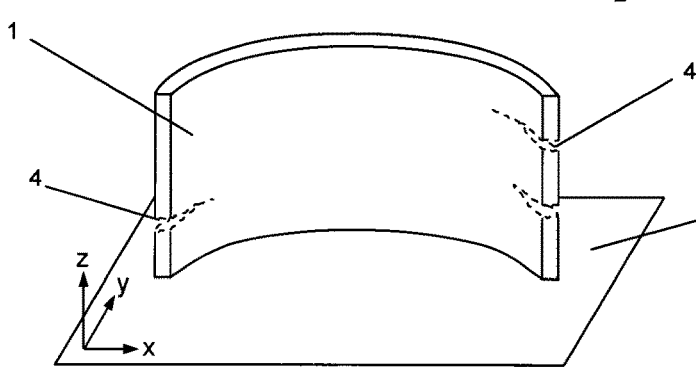
FIG. 3 is a schematic view in perspective of a second thin-walled structure made by means of a method according to the present state of the art.

Another problem that is established in the manufacture of thin-walled structures 1 is represented in FIG. 3. When building the thin-walled structure layer by layer, cracks 4 occur due to thermal stresses being generated.

Figure 4:
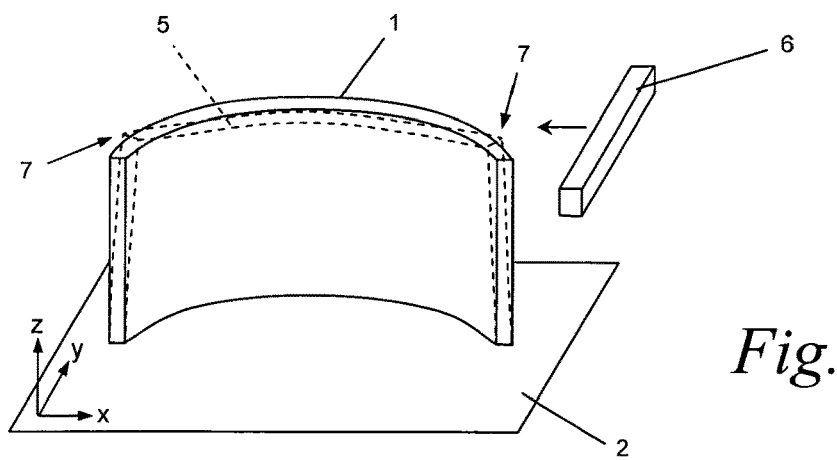
FIG. 4 is a schematic view in perspective of a third thin-walled structure made by means of a method according to the present state of the art.

In addition, under the influence of these thermal stresses, the thin-walled structure 1 may curl in the vertical direction, as is schematically represented in FIG. 4 by the deformed structure 5 represented by the dashed line. In such a case there is an additional problem in that the deposit system 6 for the successive powder layers comes into contact with the curled edges 7 of the deformed thin-walled structure 5, resulting in the device for the production of the structures 1 being disordered and possibly being damaged or in the thin-walled structure itself being damaged.

The problems above can also occur in combination when manufacturing products with thin-walled structures. Thus, for example, deformation of the products as well as cracking may be observed.

FIGS. 5a, 5b, 6a and 6b schematically represent the thermal stresses occurring as well as the resulting deformations of a thin-walled bent plate 8. In these figures, the arrows 9 schematically represent these thermal stresses.

Said thermal stresses are induced in the zone where the focused energy beam makes the powder from the powder layer melt during the building of the structure, by the subsequent cooling of this zone. As the structure is built layer by layer, these stresses accumulate layer by layer, which gives rise to the deformation of the structure as represented in FIGS. 5b and 6b by the deformed structure 8'.

In addition, the cooling and solidification of the melting bath, created by the focused energy beam, causes shrinkage in the zone concerned of the plate 8, as a result of which the plate 8 will warp as represented by the deformed structure 8' in FIGS. 5b and 6b.

Naturally, such a problem not only arises with bent thin-walled structures, but also with straight thin-walled structures.

The method according to the invention remedies the above-mentioned problems.

A first embodiment of the method according to the invention will be described by way of example by means of the thin-walled structures represented in FIGS. 7 and 8.

These figures each time represent a view from above of a product having a thin-walled structure. The part of the product 10 from FIG. 7 forming a thin-walled structure 11 has a length $l_1$ and a thickness $d_1$, whereby the ratio $l_1/d_1$ is larger than 10. The product 12, represented in FIG. 8, has a thin-walled structure 13 with a length $l_2$ and a thickness $d_2$, such that the ratio $l_2/d_2$ is larger than 10 as well.

In the method according to the invention, these products 10 and 12 are produced simultaneously and built in layers for example by selectively laser melting a metal powder. A first layer of the products 10 and 12 is hereby preferably connected to a horizontal base plate 2 and the products are directly connected to one another at their thin-walled structures 11 and 13, such that both products 10 and 12 are thus manufactured as a single unit 14. For clarity's sake, the base plate 2 is not represented in FIG. 9.

This unit 14 has a minimal thickness $d_3$ and has a length $l_3$ over said minimal thickness, whereby $d_3$ is substantially equal to the sum of $d_1$ and $d_2$. As for this unit 14 now applies that $l_3/d_3<10$, the above-mentioned problems will normally not occur and any possible generated thermal stresses or residual stresses will not give rise to any unacceptable deformations or cracking. In particular, the unit 14 will behave as a rigid and stable product while being built in layers.

Once the unit 14 which is composed of the products 10 and 12 has been entirely built, excess powder will be removed from it, and the unit 14 will be subjected to an annealing process in order to remove any thermal stresses or residual stresses or at least partly neutralize them.

Once the annealing process is finished, both products 10 and 12 are separated from the base plate 2 and from each other. This can be done for example by means of wire EDM cutting.

According to an alternative method, the products 10 and 12, after having been built, are separated from one another and are then clamped against an orifice plate, for example, and annealed in an oven together with said plate in order to remove the tension from the pieces so that they maintain their imposed shape.

FIG. 10 illustrates the manufacture of two products 15 and 16 according to a second embodiment of the method in accordance with the invention. Both products 15 and 16 have a part 17, 18 respectively with a thin-walled structure whose ratio of the length $l_4$ over the thickness $d_4$ is larger than 10. If these products 15 and 16 are to be produced as separate from one another, they will deform and possibly crack as already explained above.

According to the method in accordance with the invention, when manufacturing the products 15 and 16, at least the thin-walled structures 17 and 18 are horizontally connected, such that they form a rigid unit 19. It is preferably made sure thereby that these thin-walled structures 17 and 18 extend practically parallel to one another and extend vertically in relation to a horizontal base plate.

In this embodiment of the method according to the invention, the products 15 and 16 are oriented in such a way in relation to each other that stresses being built up in their thin-walled structures 17 and 18 during the manufacture of the products 15 and 16 neutralize one another at least partly.

To this end, while building the rigid unit 19 in layers, a support structure 20 is made which is built together with the thin-walled structures 17 and 18 and connects the latter.

Advantageously, this support structure 20 has a lower density than the thin-walled structures 17 and 18 itself and may for example be formed of a three-dimensional lattice structure or a porous structure.

The total thickness $d_5$ of the thin-walled structures 17 and 18 and the support structure 20 is sufficiently large, such that the ratio of its length $l_4$ in relation to the total thickness $d_5$ is smaller than 10.

However, as the stresses of both thin-walled structures will neutralize one another, given the chosen positioning of the thin-walled structures in relation to one another, the rigid unit 19 itself may nevertheless be thin-walled in some cases.

Once the unit 19 of the products 15 and 16 and the support structure 20 have been entirely built, said unit will be annealed in order to at least partly eliminate any stresses. Finally, the products 15 and 16 are separated from each other and from the support structure 20. As already mentioned, this can be done by means of wire EDM cutting.

FIG. 11 illustrates the method according to the invention by means of two identical thin-walled structures 17' and 18' which each form part of a cylinder jacket.

In this embodiment, the thin-walled structures 17' and 18' are built symmetrically in relation to one another, whereby they are oriented in relation to one another in such a way that any stresses being built in these thin-walled structures 17' and 18' during their manufacture at least neutralize one another as they are connected by means of a support structure 20. In the given example, this support structure 20 is formed of an open porous lattice structure consisting of three separate parts 20a, 20b and 20c. As both thin-walled structures 17' and 18' are positioned symmetrically in relation to one another, any stresses which may occur during the building in layers of these structures 17' and 18' will neutralize each other between both structures, such that there are practically no deformations.

In the example of FIG. 11, the thin-walled structures are identical and placed symmetrically in relation to each other. Naturally, products must not necessarily be identical in order to neutralize each other's stresses while being built in layers. Thin-walled structures with different shapes can usually be positioned in such a way in relation to each other, however, that any stresses built up while said structures are being simultaneously manufactured in layers will be sufficiently neutralized in order to avoid deformation of these structures. This implies for example that stresses may still be built up in the thin-walled structures, however, but that these stresses will be sufficiently small to restrict any deformations occurring as a result thereof to predetermined tolerances.

The method according to the invention can also be applied to manufacture merely one thin-walled structure. Thus, a support structure is built in layers together with the thin-walled structure, whereby this support structure joins at least one side of the thin-walled structure and is connected to the latter while the thin-walled structure and the support structure are being built up together. In this way is manufactured a rigid unit which prevents the thin-walled structure from deforming. Advantageously, the support structure is hereby made to join at least two opposite sides of the thin-walled structure. In certain cases it may be interesting to manufacture a support structure together with the product having the thin-walled structure, whereby this support structure envelopes the product, or at least its thin-walled structure, almost completely.

This last embodiment of the invention is illustrated in FIG. 12, whereby a thin-walled structure 1 is built in layers on a base plate 2. Together with the thin-walled structure 1, a support structure 20 is built in layers. This support structure 20 joins the two opposite sides of the thin-walled structure 1, whereby the support structure 20 entirely envelopes the thin-walled structure 1, or at least its lateral surfaces. In FIG. 11, this support structure thus forms a beam-shaped volume comprising the thin-walled structure 1. The shape of the volume of the support structure may vary, however, as a function of the shape of the thin-walled structure that it comprises.

Thus, the thin-walled structure 1 is connected to the support structure 20, such that a rigid unit is obtained whereby, while it is being built up, this thin-walled structure 2 practically cannot deform due to thermal stresses or other internal stresses that are generated while the thin-walled structure 1 is being manufactured in layers.

After the thin-walled structure 1 and the support structure 20 have been entirely built as a whole, this unit is annealed in order to at least partly neutralize any internal stresses, such that after the removal of the support structure 20 and the base plate 2 from the thin-walled structure 1, the latter will not deform.

In the support structure 20 represented in FIG. 12, it is formed of a three-dimensional lattice which preferably has a lower density than the thin-walled structure 1 itself.

Naturally, although the preceding embodiments of the method according to the invention were illustrated by means of products having a flat thin-walled structure, the method can also be applied to thin-walled structures which are not flat but bent, for example. In that case, the shape of the support structure can for example be adapted to the dimensions and shape of the thin-walled structures. Thin-walled structures can also be connected to one another partly directly and partly via said support structure.

In the above-described embodiments of the invention, a product or a thin-walled structure is made extending practically vertically in relation to the horizontal base plate 2 on which they are manufactured. Naturally, the invention can also be applied to thin-walled structures with very different and varying shapes or orientations. Thus, a thin-walled structure may for example be inclined in relation to the base plate 2.

Further, it is also possible to orient thin-walled structures in such a way in relation to each other and to connect them during their manufacture, such that stresses being built up in these thin-walled structures during their manufacture will neutralize each other at least partly, so that deformation or cracking are avoided as well or will not exceed a certain tolerance.

Thus, it is possible for example to connect almost identical thin-walled structures symmetrically in relation to one another and to simultaneously build them in layers, such that stresses arising in both structures will neutralize each other.

Naturally, the invention is not restricted to the above-described embodiments of the method for manufacturing thin-walled structures. Thus, it is for example also possible to form a unit connecting more than two thin-walled structures to each other so as to form a rigid unit. From such a unit are then separated for example three or more products after the unit has been built in layers and has been annealed.

It is also possible to build a thin-walled structure together with a thick-walled structure and to connected them to each other so as to form a unit. In that case, depending on the shape of the structures, one may choose to either or not provide a support structure between the thin-walled structure and the thick-walled structure.

The invention claimed is:

1. A method for manufacturing two or more thin-walled structures, each thin-walled structure forming an individual object, the method comprising:
building the thin-walled structures together and in layers by applying successive powder layers extending substantially horizontally and by moving an energy beam over each of these powder layers according to a predetermined pattern so as to make said powder melt entirely or partly and subsequently make it solidify or sinter, such that successive layers of said thin-walled structures are formed which extend according to a horizontal cross section of these structures, wherein said thin-walled structures are built in layers starting from a horizontal base plate and a first layer of the structures is connected to the base plate,
further connecting said thin-walled structures to each other without building a support structure around the thin-walled structures, such that said thin-walled structures together form a rigid unit by orienting said thin-walled structures in relation to each other such that any stresses being built up in the thin-walled structures during their manufacture at least partly neutralize each other, each of said thin-walled structures would undergo deformations if being built individually without being connected to each other,
after said rigid unit has been built in layers with said thin-walled structures, annealing at least the thin-walled structures to at least partly eliminate any stresses present, and separating said thin-walled structures from each other to obtain said individual objects.

2. The method according to claim 1, further comprising manufacturing two of said thin-walled structures simultaneously and symmetrically in relation to each other, and connecting said structures to each other during the step of manufacturing, such that any stresses arising in both structures will neutralize each other.

3. The method according to claim 1, wherein said thin-walled structures, during their manufacture, extend parallel to each other.

4. The method according to claim 1, further comprising connecting said thin-walled structures directly to each other during their manufacture.

5. The method according to claim 1, further comprising building a support structure in layers together with said thin-walled structures, wherein the support structure extends between said thin-walled structures, and wherein the support structure joins at least one side of said thin-walled structures and is connected to said structures while building jointly the thin-walled structures and the support structure in layers, such that a rigid unit is manufactured.

6. The method according to claim 5, further comprising joining at least two opposite sides of said thin-walled structures by said support structure and connecting the support structure to said thin-walled structures while the thin-walled structures and the support structure are being built together in layers, such that said rigid unit is manufactured.

7. The method according to claim 5, further comprising making a lattice structure or a porous structure forming said support structure.

8. The method according to claim 1, further comprising fabricating said support structure with a lower density than said thin-walled structures.

9. The method according to claim 1, further comprising connecting the thin-walled structures to each other preferably horizontally, wherein a ratio of the horizontal length to the horizontal thickness of each of said thin-walled structures is larger than 10, such that the thin-walled structures form a unit whose ratio of the horizontal length to the horizontal thickness is smaller than or equal to 10.

10. The method according to claim 1, wherein said thin-walled structures extend at least on average in a vertical direction.

11. The method according to claim 1, wherein said thin-walled structures are built in layers starting from a horizontal base plate.

12. The method according to claim 1, wherein said thin-walled structures are manufactured by means of selective laser sintering or selective laser melting.

13. The method according to claim 1, further comprising orienting said thin-walled structures in relation to each other such that any stresses being built up in the thin-walled structures during manufacture will neutralize each other at least partly, such that no deformations will occur due to these stresses or will not exceed a tolerance.

14. A method for manufacturing two or more thin-walled structures, each thin-walled structure forming an individual object, the method consisting of:
building the thin-walled structures together and in layers by applying successive powder layers extending substantially horizontally and by moving an energy beam over each of these powder layers according to a predetermined pattern so as to make said powder melt entirely or partly and subsequently make it solidify or sinter, such that successive layers of said thin-walled structures are formed which extend according to a horizontal cross section of these structures, connecting said thin-walled structures to each other over at least a part of their surface, such that these thin-walled structures form a rigid unit, and orienting said thin-walled structures in relation to each other such that any stresses being built up in the thin-walled structures during their manufacture at least partly neutralize each other, after said unit has been built in layers with said thin-walled structures, annealing at least the thin-walled structures to at least partly eliminate any stresses present, and separating said thin-walled structures from each other to obtain said individual objects.

15. The method according to claim 14, further comprising manufacturing two of said thin-walled structures simultaneously and symmetrically in relation to each other, and connecting said structures to each other during the step of manufacturing, such that any stresses arising in both structures will neutralize each other.

16. The method according to claim 14, further comprising building a support structure in layers together with said thin-walled structures, wherein the support structure extends between said thin-walled structures, and wherein the support structure joins at least one side of said thin-walled structures and is connected to said structures while building jointly the thin-walled structures and the support structure in layers, such that a rigid unit is manufactured.

* * * * *